US012743235B2

(12) United States Patent
Greathouse et al.

(10) Patent No.: US 12,743,235 B2
(45) Date of Patent: *Sep. 22, 2026

(54) DMA ENGINES CONFIGURED TO PERFORM FIRST PORTION DATA TRANSFER COMMANDS WITH A FIRST DMA ENGINE AND SECOND PORTION DATA TRANSFER COMMANDS WITH SECOND DMA ENGINE

(71) Applicants: ADVANCED MICRO DEVICES, INC., Santa Clara, CA (US); ATI TECHNOLOGIES ULC, Markham (CA)

(72) Inventors: Joseph L. Greathouse, Santa Clara, CA (US); Sean Keely, Santa Clara, CA (US); Alan D. Smith, Santa Clara, CA (US); Anthony Asaro, Markham (CA); Ling-Ling Wang, Santa Clara, CA (US); Milind N Nemlekar, Santa Clara, CA (US); Hari Thangirala, Santa Clara, CA (US); Felix Kuehling, Markham (CA)

(73) Assignees: Advanced Micro Devices, Inc., Santa Clara, CA (US); A TI TECHNOLOGIES ULC, Markham (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/665,840

(22) Filed: May 16, 2024

(65) Prior Publication Data

US 2024/0419358 A1 Dec. 19, 2024

Related U.S. Application Data

(63) Continuation of application No. 17/515,976, filed on Nov. 1, 2021, now Pat. No. 11,995,351.

(51) Int. Cl.
*G06F 3/00* (2006.01)
*G06F 3/06* (2006.01)
*G06F 13/28* (2006.01)

(52) U.S. Cl.
CPC ............ *G06F 3/0659* (2013.01); *G06F 3/061* (2013.01); *G06F 3/0679* (2013.01); *G06F 13/28* (2013.01)

(58) Field of Classification Search
CPC . G06F 3/06; G06F 13/28; G06F 3/069; G06F 3/061; G06F 3/0679; G06F 3/00
See application file for complete search history.

(56) References Cited

U.S. PATENT DOCUMENTS 8,255,593 B2 * 8/2012 Siddabathuni .......... G06F 13/28 710/22
8,271,700 B1 9/2012 Annem et al.
(Continued)

FOREIGN PATENT DOCUMENTS

CN 103714027 4/2014
JP 2012039143 2/2012

OTHER PUBLICATIONS

Extended European Search Report mailed Jul. 2, 2025 for Application No. 22888240.3, 7 pages.
(Continued)

*Primary Examiner* — Tammara R Peyton

(57) ABSTRACT

A method for hardware management of DMA transfer commands includes accessing, by a first DMA engine, a DMA transfer command and determining a first portion of a data transfer requested by the DMA transfer command. Transfer of a first portion of the data transfer by the first DMA engine is initiated based at least in part on the DMA transfer command. Similarly, a second portion of the data transfer by a second DMA engine is initiated based at least in part on the DMA transfer command. After transferring the
(Continued)

first portion and the second portion of the data transfer, an indication is generated that signals completion of the data transfer requested by the DMA transfer command.

20 Claims, 6 Drawing Sheets

(56) References Cited

U.S. PATENT DOCUMENTS

| | | | | |
|---|---|---|---|---|
| 8,341,311 | B1 * | 12/2012 | Szewerenko | G06F 13/28 710/52 |
| 9,424,213 | B2 | 8/2016 | Dobbs et al. | |
| 9,645,738 | B2 * | 5/2017 | Trachy | G06F 3/0605 |
| 10,459,854 | B2 * | 10/2019 | Park | G06F 13/28 |
| 11,809,953 | B1 * | 11/2023 | Jacob | G06N 3/063 |
| 11,847,507 | B1 * | 12/2023 | Borkovic | G06F 9/522 |
| 11,995,351 | B2 * | 5/2024 | Greathouse | G06F 13/28 |
| 12,197,970 | B2 * | 1/2025 | Dobbs | G06F 9/44505 |
| 12,250,163 | B2 * | 3/2025 | Kasichainula | G06F 13/28 |
| 12,386,766 | B2 * | 8/2025 | Peng | G06F 13/1689 |
| 2008/0109604 | A1 | 5/2008 | Reilly et al. | |
| 2014/0132611 | A1 * | 5/2014 | Chen | G06F 13/1663 345/502 |
| 2018/0260343 | A1 * | 9/2018 | Park | G06F 13/1668 |
| 2020/0328192 | A1 * | 10/2020 | Zaman | H04L 49/10 |

OTHER PUBLICATIONS

OA—International Preliminary Report on Patentability issued in Application No. PCT/US2022/048214, mailed May 16, 2024, 7 pages.

Office Action mailed Dec. 2, 2025 for Japanese Application No. 2024-525409, 10 pages.

Office Action mailed Mar. 18, 2026 for European Application No. 22888240.3, 7 pages.

Office Action mailed Apr. 30, 2026 for Indian Application No. 202417032384, 13 pages.

“NPL-A. Tumeo et al. ”Lightweight DMA management mechanisms formultiprocessors on FPGA,“ 2008 International Conference onApplication-Specific Systems, Architectures and Processors, Leuven, Belgium, 2008, pp. 275-280, doi: 10.1109/ASAP.2008.4580191”.

Office Action mailed May 19, 2026 for Japanese Application No. 2024-525409, 4 pages.

* cited by examiner

DMA ENGINES CONFIGURED TO PERFORM FIRST PORTION DATA TRANSFER COMMANDS WITH A FIRST DMA ENGINE AND SECOND PORTION DATA TRANSFER COMMANDS WITH SECOND DMA ENGINE

CROSS-REFERENCE TO RELATED APPLICATIONS

The present application is a continuation application of U.S. patent application Ser. No. 17/515,976, entitled "DMA ENGINES CONFIGURED TO PERFORM FIRST PORTION DATA TRANSFER COMMANDS WITH A FIRST DMA ENGINE AND SECOND PORTION DATA TRANSFER COMMANDS WITH SECOND DMA ENGINE", and filed on Nov. 1, 2021, now issued as U.S. Pat. No. 11,995,351, the entirety of which is incorporated by reference herein.

BACKGROUND

A system direct memory access (DMA) engine is a module which coordinates direct memory access transfers of data between devices (e.g., input/output interfaces and display controllers) and memory, or between different locations in memory, within a computer system. A DMA engine is often located on a processor, such as a central processing unit (CPU) or a graphics processor (GPU) and receives commands from an application running on the processor. Based on the commands, the DMA engine reads data from a DMA source (e.g., a first memory buffer defined in memory) and writes data to a DMA destination (e.g., a second buffer defined in memory).

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Conventional processors include one or more direct memory access engines to read and write blocks of data stored in a system memory. The direct memory access engines relieve processor cores from the burden of managing transfers. In response to data transfer requests from the processor cores, the direct memory access engines provide requisite control information to the corresponding source and destination such that data transfer operations can be executed without delaying computation code, thus allowing communication and computation to overlap in time. With the direct memory access engine asynchronously handling the formation and communication of control information, processor cores are freed to perform other tasks while awaiting satisfaction of the data transfer requests.

Distributed architectures are increasingly common alternatives to monolithic processing architecture in which physically or logically separated processing units are operated in a coordinated fashion via a high-performance interconnection. One example of such a distributed architecture is a chiplet architecture, which captures the advantages of fabricating some portions of a processing unit at smaller nodes while allowing other portions to be fabricated at nodes having larger dimensions if the other portions do not benefit from the reduced scales of the smaller nodes. The number of direct memory access engines will likely increase in chiplet-based systems (such as relative to an equivalent monolithic, non-chiplet based design).

To increase system performance by improving utilization of direct memory access engines, FIGS. 1-6 illustrate systems and methods that utilize hardware-managed coordination for the processing of direct memory transfer commands. In various embodiments, a method for hardware management of DMA transfer commands includes accessing, by a first DMA engine, a DMA transfer command and determining a first portion of a data transfer requested by the DMA transfer command. Transfer of a first portion of the data transfer by the first DMA engine is initiated based at least in part on the DMA transfer command. Similarly, a second portion of the data transfer by a second DMA engine (that is, a different DMA engine than the first DMA engine) is initiated based at least in part on the DMA transfer command. After transferring the first portion and the second portion of the data transfer, an indication is generated that signals completion of the data transfer requested by the DMA transfer command. In this manner, the work specified by a transfer command is split across DMA engines such that total bandwidth usage goes up without each individual DMA engine needing to get bigger or have more capabilities to increase overall DMA throughput and data fabric bandwidth usage.

Figure 1:
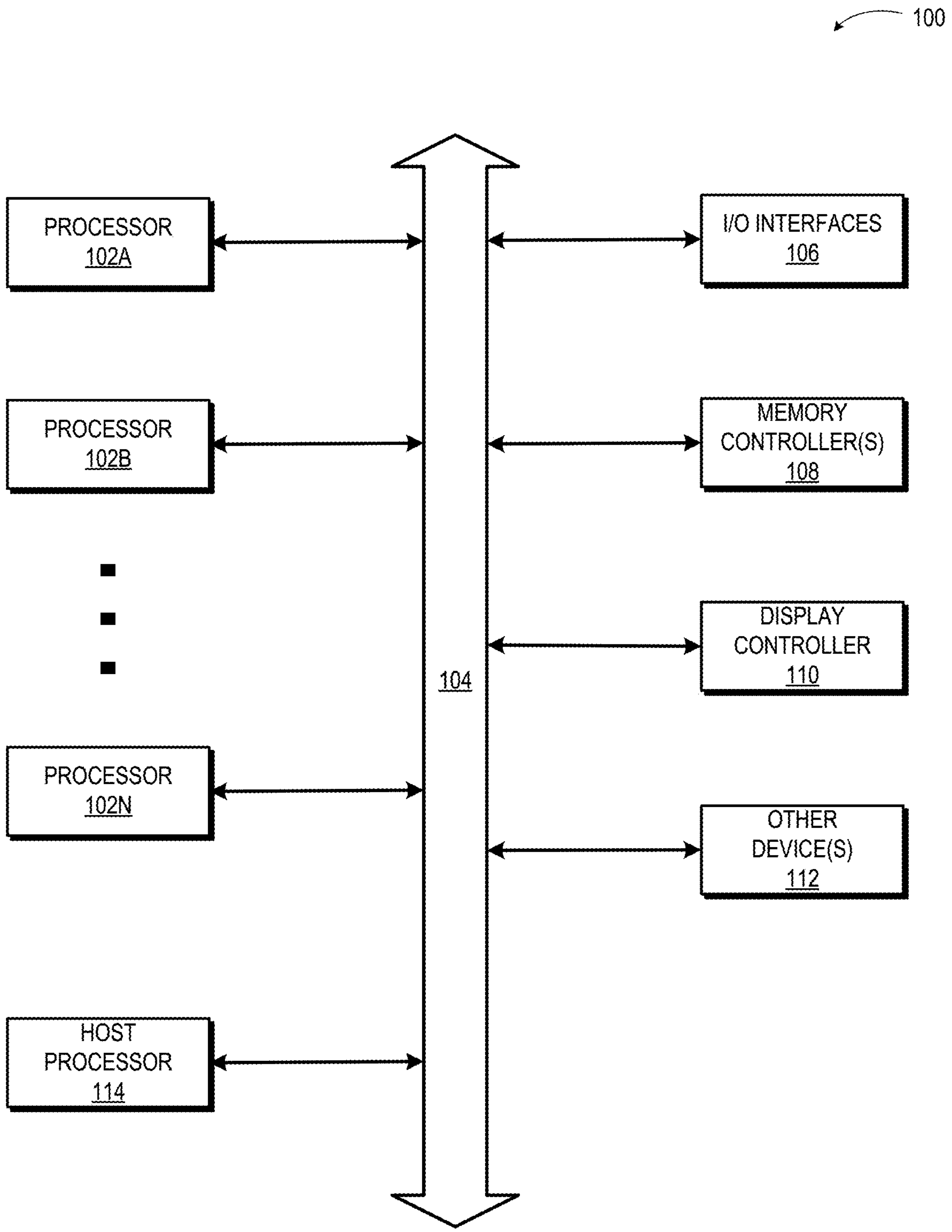
FIG. 1 illustrates a block diagram of a computing system implementing a multi-die processor in accordance with some embodiments.

FIG. 1 illustrates a block diagram of one embodiment of a computing system 100 implementing a multi-die processor in accordance with some embodiments. In various embodiments, computing system 100 includes at least one or more processors 102A-N, fabric 104, input/output (I/O) interfaces 106, memory controller(s) 108, display controller 110, and other device(s) 112. In various embodiments, to support execution of instructions for graphics and other types of workloads, the computing system 100 also includes a host processor 114, such as a central processing unit (CPU). In various embodiments, computing system 100 includes a computer, laptop, mobile device, server, or any of various other types of computing systems or devices. It is noted that the number of components of computing system 100 varies in some embodiments. It is also noted that in some embodiments computing system 100 includes other components not shown in FIG. 1. Additionally, in other embodiments, computing system 100 is structured in other ways than shown in FIG. 1.

Fabric 104 is representative of any communication interconnect that complies with any of various types of protocols utilized for communicating among the components of the computing system 100. Fabric 104 provides the data paths, switches, routers, and other logic that connect the processing units 102, I/O interfaces 106, memory controller(s) 108, display controller 110, and other device(s) 112 to each other. Fabric 104 handles the request, response, and data traffic, as well as probe traffic to facilitate coherency. Fabric 104 also handles interrupt request routing and configuration access paths to the various components of computing system 100. Additionally, fabric 104 handles configuration requests, responses, and configuration data traffic. In some embodiments, fabric 104 is bus-based, including shared bus configurations, crossbar configurations, and hierarchical buses with bridges. In other embodiments, fabric 104 is packet-based, and hierarchical with bridges, crossbar, point-to-point, or other interconnects. From the point of view of fabric 104, the other components of computing system 100 are referred to as "clients". Fabric 104 is configured to process requests generated by various clients and pass the requests on to other clients.

Memory controller(s) 108 are representative of any number and type of memory controllers coupled to any number and type of memory device(s). For example, the type of memory device(s) coupled to memory controller(s) 108 include Dynamic Random Access Memory (DRAM), Static Random Access Memory (SRAM), NAND Flash memory, NOR flash memory, Ferroelectric Random Access Memory (FeRAM), or others. Memory controller(s) 108 are accessible by processors 102, I/O interfaces 106, display controller 110, and other device(s) 112 via fabric 104. I/O interfaces 106 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices are coupled to I/O interfaces 106. Such peripheral devices include (but are not limited to) displays, keyboards, mice, printers, scanners, joysticks or other types of game controllers, media recording devices, external storage devices, network interface cards, and so forth. Other device(s) 112 are representative of any number and type of devices (e.g., multimedia device, video codec).

In various embodiments, each of the processors 102 is a parallel processor (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like). Each parallel processor 102 is constructed as a multi-chip module (e.g., a semiconductor die package) including two or more base integrated circuit dies (described in more detail below with respect to FIG. 2) communicably coupled together with bridge chip(s) such that a parallel processor is usable (e.g., addressable) like a single semiconductor integrated circuit. As used in this disclosure, the terms "die" and "chip" are interchangeably used. Those skilled in the art will recognize that a conventional (e.g., not multi-chip) semiconductor integrated circuit is manufactured as a wafer or as a die (e.g., single-chip IC) formed in a wafer and later separated from the wafer (e.g., when the wafer is diced); multiple ICs are often manufactured in a wafer simultaneously. The ICs and possibly discrete circuits and possibly other components (such as non-semiconductor packaging substrates including printed circuit boards, interposers, and possibly others) are assembled in a multi-die parallel processor.

As described in more detail with respect to FIGS. 2-6 below, in various embodiments, each of the individual processors 102 include one or more base IC dies employing processing stacked die chiplets in accordance with some embodiments. The base dies are formed as a single semiconductor chip package including N number of communicably coupled graphics processing stacked die chiplets. In various embodiments, the base IC dies include two or more DMA engines that coordinate DMA transfers of data between devices and memory (or between different locations in memory). It should be recognized that although various embodiments are described below in the particular context of CPUs and GPUs for ease of illustration and description, the concepts described herein are also similarly applicable to other processors including accelerated processing units (APUs), discrete GPUs (dGPUs), artificial intelligence (AI) accelerators, other parallel processors, and the like.

Figure 2:
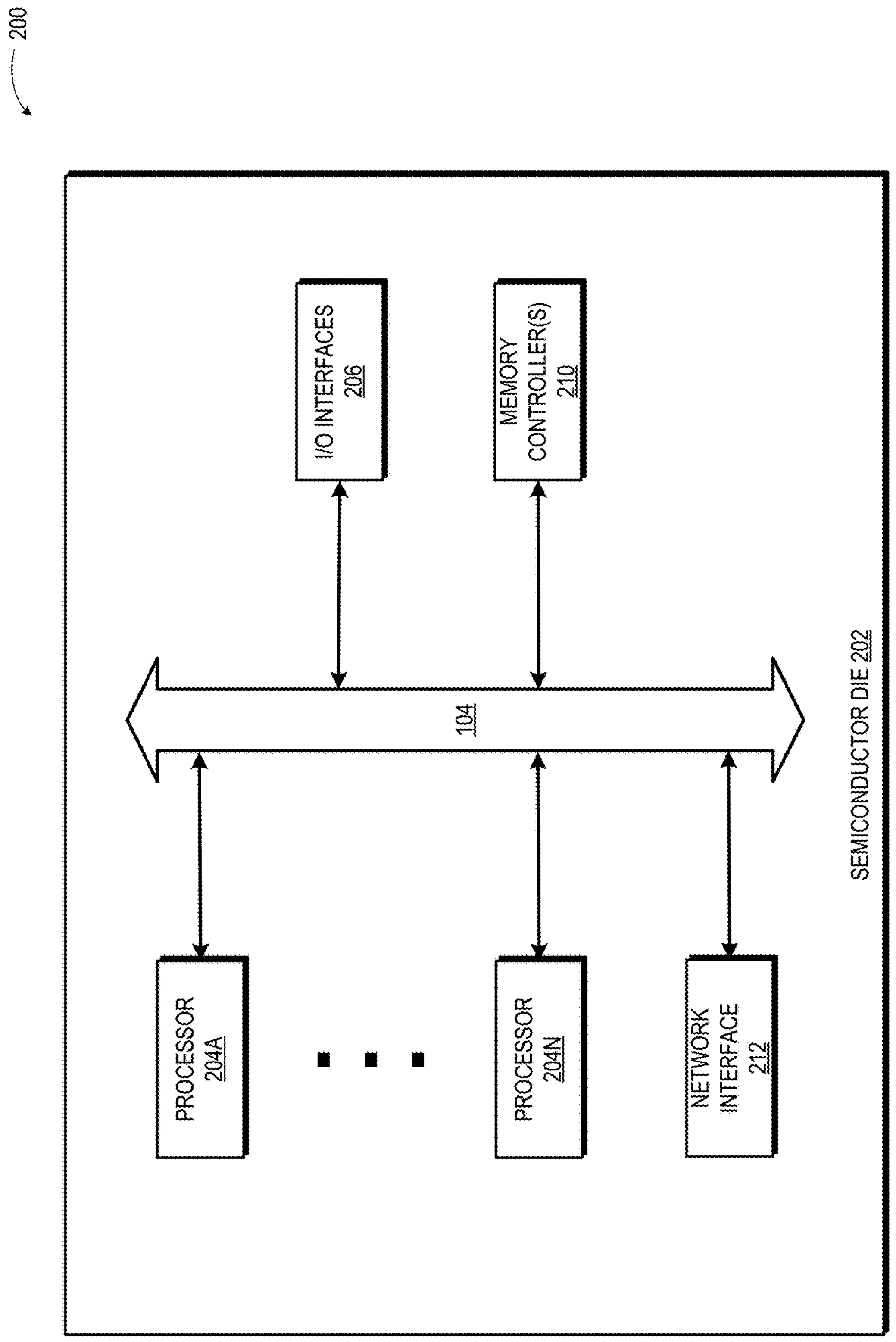
FIG. 2 is a block diagram of portions of an example computing system for implementing hardware management of DMA commands in accordance with some embodiments.

Referring now to FIG. 2, illustrated is a block diagram of portions of an example computing system 200. In some examples, computing system 200 is implemented using some or all of device 100, as shown and described with respect to FIG. 1. Computing system 200 includes at least a first semiconductor die 202. In various embodiments, semiconductor die 202 includes one or more processors 204A-N, input/output (I/O) interfaces 206, intra-die interconnect 208, memory controller(s) 210, and network interface 212. In other examples, computing system 200 includes further components, different components, and/or is arranged in a different manner. In some embodiments, the semiconductor die 202 is a multi-chip module constructed as a semiconductor die package including two or more integrated circuit (IC) dies, such that a processor may be used like a single semiconductor integrated circuit. As used in this disclosure, the terms "die" and "chip" may be interchangeably used.

In some embodiments, each of the processors 204A-N includes one or more processing devices. In one embodiment, at least one of processors 204A-N includes one or more general purpose processing devices, such as CPUs. In some implementations, such processing devices are implemented using processor 102 as shown and described with respect to FIG. 1. In another embodiment, at least one of processors 204A-N includes one or more parallel processors. Examples of parallel processors include GPUs, digital signal processors (DSPs), field programmable gate arrays (FPGAs), application specific integrated circuits (ASICs), and the like.

The I/O interfaces 206 include one or more I/O interfaces (e.g., peripheral component interconnect (PCI) bus, PCI-Extended (PCI-X), PCIE (PCI Express) bus, gigabit Ethernet (GBE) bus, universal serial bus (USB), and the like). In some implementations, I/O interfaces 206 are implemented using input driver 112, and/or output driver 114 as shown and described with respect to FIG. 1. Various types of peripheral devices can be coupled to I/O interfaces 206. Such peripheral devices include (but are not limited to) displays, keyboards, mice, printers, scanners, joysticks or other types of game controllers, media recording devices, external storage devices, network interface cards, and so forth. In some implementations, such peripheral devices are implemented using input devices and/or output devices as shown and described with respect to FIG. 1.

In various embodiments, each processor includes a cache subsystem with one or more levels of caches. In some embodiments, each of the processors 204A-N includes a cache (e.g., level three (L3) cache) which is shared among multiple processor cores of a core complex. The memory controller 210 includes at least one memory controller accessible by processors 204A-N, such as accessible via intra-die interconnect 208. In various embodiments, memory controller 210 includes one or more of any suitable type of memory controller. Each of the memory controllers are coupled to (or otherwise in communication with) and control access to any number and type of memory devices (not shown). In some implementations, such memory devices include dynamic random access memory (DRAM), static random access memory (SRAM), NAND Flash memory, NOR flash memory, ferroelectric random access memory (FeRAM), or any other suitable memory device. The intra-die interconnect 208 includes any computer communications medium suitable for communication among the devices shown in FIG. 2, such as a bus, data fabric, or the like.

Figure 3:
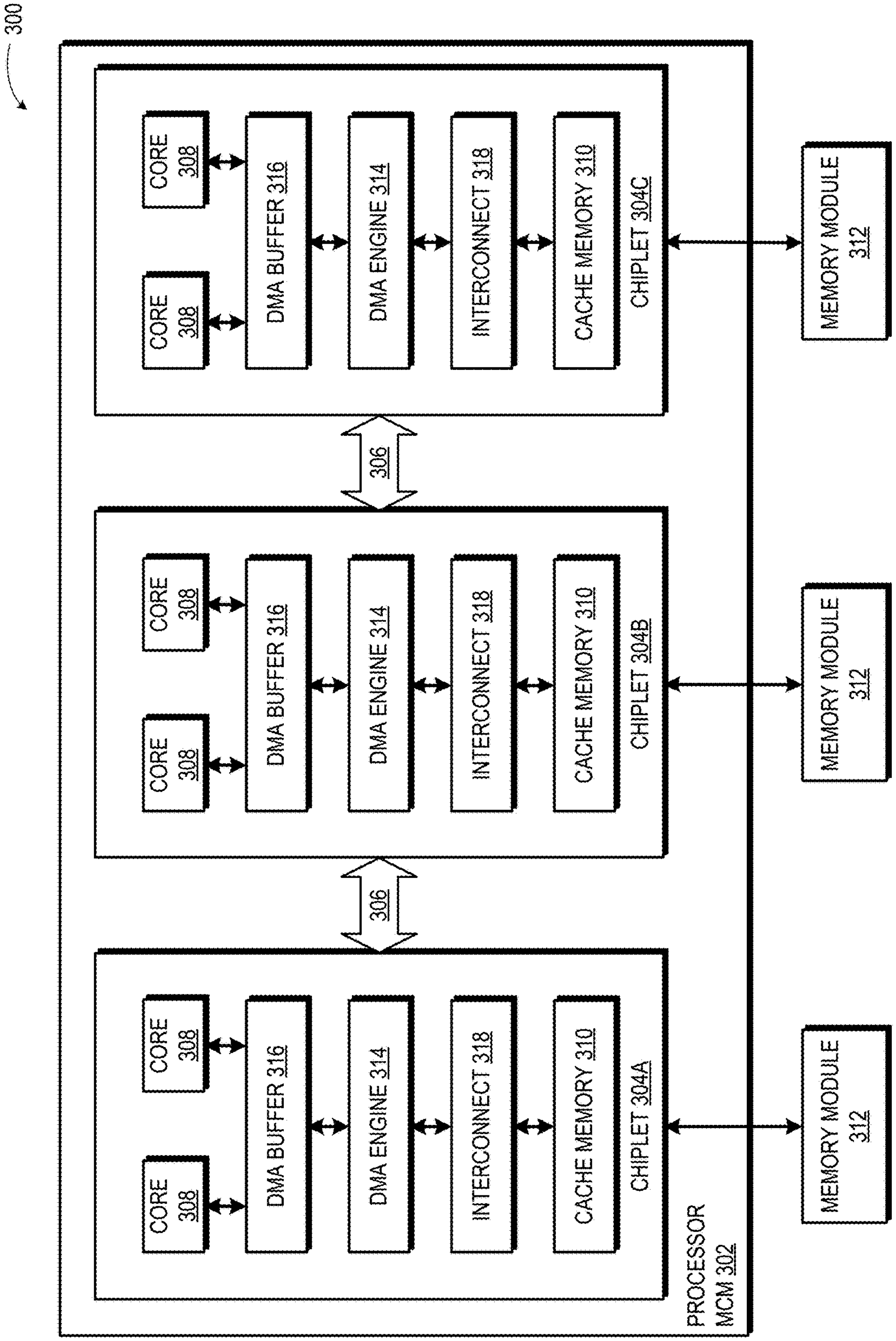
FIG. 3 is a block diagram illustrating portions of an example multi-processor computing system for implementing hardware management of DMA commands in accordance with some embodiments.

FIG. 3 is a block diagram illustrating portions of an example multi-processor computing system 300. System 300, or portions thereof, is implementable using some or all of semiconductor die 202 (as shown and described with respect to FIG. 2) and/or device 100 (as shown and described with respect to FIGS. 1 and 2). In various embodiments, the system 300 includes a processor multi-chip module 302 employing processing stacked die chiplets in accordance with some embodiments. The processor multi-chip module 302 is formed as a single semiconductor chip package including N=3 number of communicably coupled graphics processing stacked die chiplets 304. As shown, the processor multi-chip module 302 includes a first graphics processing stacked die chiplet 304A, a second graphics processing stacked die chiplet 304B, and a third graphics processing stacked die chiplet 304C.

It should be recognized that although the graphics processing stacked die chiplets 304 are described below in the particular context of GPU terminology for ease of illustration and description, in various embodiments, the architecture described is applicable to any of a variety of types of parallel processors (such as previously described more broadly with reference to FIGS. 2 and 3) without departing from the scope of this disclosure. Additionally, in various embodiments, and as used herein, the term "chiplet" refers to any device including, but is not limited to, the following characteristics: 1) a chiplet includes an active silicon die containing at least a portion of the computational logic used to solve a full problem (i.e., the computational workload is distributed across multiples of these active silicon dies); 2) chiplets are packaged together as a monolithic unit on the same substrate; and 3) the programming model preserves the concept that the combination of these separate computational dies (i.e., the graphics processing stacked die chiplet) as a single monolithic unit (i.e., each chiplet is not exposed as a separate device to an application that uses the chiplets for processing computational workloads).

In various embodiments, the processor multi-chip module 302 includes an inter-chip data fabric 306 that operates as a high-bandwidth die-to-die interconnect between chiplets (e.g., between any combination of the first graphics processing stacked die chiplet 304A, the second graphics processing stacked die chiplet 304B, and the third graphics processing stacked die chiplet 304C). In some embodiments, the processor multi-chip module 302 includes one or more processor cores 308 (e.g., CPUs and/or GPUs, or processor core dies) formed over each of the chiplets 304A-304C. Additionally, in various embodiments, each of the chiplets 304A-304C includes one or more levels of cache memory 310 and one or more memory PHYs (not shown) for communicating with external system memory modules 312, such as dynamic random access memory (DRAM) modules.

Each of the chiplets 304A-304C also includes one or more DMA engines 314. In various embodiments, the one or more DMA engines 314 coordinate DMA transfers of data between devices and memory (or between different locations in memory) within system 300. The one or more DMA engines 314 coordinate, in various embodiments, moving of data between the multiple devices/accelerators while computation(s) are performed on other data at, for example, the processor cores 308. In various embodiments, the one or more DMA engines 314 are, in some embodiments, part of a DMA controller (not shown) but the terms DMA engine and DMA controller are used interchangeably herein. The DMA engines 314, in response to commands, operate to transfer data into and out of, for example, the one or more memory modules 312 without involvement of the processor cores 308. Similarly, the DMA engines 314, in some embodiments, performs intra-chip data transfers. As will be appreciated, the DMA engines 314 relieve processor cores from the burden of managing data transfers, and, in various embodiments, are used as a global data transfer agent to handle various data transfer requirements from software, such as memory-to-memory data copying.

The one or more DMA engines 314 provide for fetching and decoding of command packets from application/agent queues and respective DMA buffers to perform the desired data transfer operations as specified by DMA commands, also known as descriptors. DMA commands include memory flow commands that transfer or control the transfer of memory locations containing data or instructions (e.g., read/get or write/put commands for transferring data in or out of memory). The DMA command descriptors indicate, in various embodiments, a source address from which to read the data, a transfer size, and a destination address to which the data are to be written for each data transfer operation. The descriptors are commonly organized in memory as a linked list, or chain, in which each descriptor contains a field indicating the address in the memory of the next descriptor to be executed. In various embodiments, the descriptors are also an array of commands with valid bits, where the command is of a known size and the one or more DMA engines 314 stop when it reaches an invalidate command. The last descriptor in the list has a null pointer in the "next descriptor" field, indicating to the DMA engine that there are no more commands to be executed, and DMA should become idle once it has reached the end of the chain.

In response to data transfer requests from the processor cores, the DMA engines 314 provide the requisite control information to the corresponding source and destination so that the data transfer requests are satisfied. Because the DMA engines 314 handle the formation and communication of the control information, processor cores are freed to perform other tasks while awaiting satisfaction of the data transfer requests. In various embodiments, each of the DMA engines 314 includes one or more specialized auxiliary processor(s) that transfer data between locations in memory and/or peripheral input/output (I/O) devices and memory without intervention of processor core(s) or CPUs.

In some embodiments, demand for DMA is handled by placing DMA commands generated by one or more of the processors 308 in memory mapped IO (MMIO) locations such as at DMA buffer(s) 316 (also interchangeably referred to as DMA queues for holding DMA transfer commands). In various embodiments, the DMA buffer is a hardware structure into which read or write instructions are transferred such that the DMA engines 314 can read DMA commands out of (e.g., rather than needing to go to DRAM memory). To perform data transfer operations, in various embodiments, the DMA engines 314 receive instructions (e.g., DMA transfer commands/data transfer requests) generated by the processors 308 by accessing a sequence of commands in the DMA buffer(s) 316. The DMA engines 314 then retrieve the DMA commands (also known as descriptors) from the DMA buffer(s) 316 for processing. In some embodiments, the DMA commands specify, for example, a start address for direct virtual memory access (DVMA) and I/O bus accesses, and a transfer length up to a given maximum.

Although the DMA buffer(s) 316 are illustrated in FIG. 3 as being implemented at the chiplets 304 for ease of illustration, those skilled in the art will recognize that the DMA buffer(s) 316 are implementable at various components of the systems and devices described herein without departing from the scope of this disclosure. For example, in some embodiments, the DMA buffer(s) 316 are configured in main memory such as at memory modules 312. That location of the command queue in memory is where DMA engines 314 go to read transfer commands. In various embodiments, the DMA buffer(s) 316 are further configured as one or more ring buffers (e.g., addressed by modulo-addressing).

The DMA engines 314 access DMA transfer commands (or otherwise receives commands) from the DMA buffer(s) 316 over a bus (not shown). Based on the received instructions, in some embodiments, the DMA engines 314 read and buffer data from any memory (e.g., memory modules 312) via the data fabric 306, and write the buffered data to any memory via the data fabric 306. In some implementations, a DMA source and DMA destination are physically located on different devices (e.g., different chiplets). Similarly, in multi-processor systems, the DMA source and DMA destination are located on different devices associated with different processors in some cases. In such cases, the DMA engine 314 resolves virtual addresses to obtain physical addresses, and issues remote read and/or write commands to affect the DMA transfer. For example, in various embodiments, based on the received instructions, DMA engines 314 send a message to a data fabric device with instructions to affect a DMA transfer.

During DMA, the one or more processor cores 308 queue DMA commands in the DMA buffer(s) 316 and can signal their presence to the DMA engines 314. For example, in some embodiments, an application program running on the system 300 prepares an appropriate chain of descriptors in memory accessible to the DMA engine (e.g., DMA buffers 316) to initiate a chain of DMA data transfers. The processor cores 308 then send a message (or other notification) to the DMA engine 314 indicating the memory address of the first descriptor in the chain, which is a request to the DMA engine to start execution of the descriptors. The application typically sends the message to the “doorbell” of the DMA engine—a control register with a certain bus address that is specified for this purpose. Sending such a message to initiate DMA execution is known as “ringing the doorbell” of the DMA engine 314. The DMA engine 314 responds by reading and executing the first descriptor. It then updates a status field of the descriptor to indicate to the application that the descriptor has been executed. The DMA engine 314 follows the “next” field through the entire linked list, marking each descriptor as executed, until it reaches the null pointer in the last descriptor. After executing the last descriptor, the DMA engine 314 becomes idle and is ready to receive a new list for execution.

In various embodiments, such as illustrated in FIG. 3, the system 300 includes two or more accelerators connected together by the inter-chip data fabric 306. Further, as illustrated in FIG. 3, the components of the graphics processing stacked die chiplets 304 (e.g., the one or more processor cores 308, DMA engines 314, DMA buffers 316, and the like) are in communication with each other over interconnect 318 (e.g., via other components). In this manner, the interconnect 318 forms part of a data fabric which facilitates communication among components of multi-processor computing system 300. Further, the inter-chip data fabric 306 extends the data fabric over the various communicably coupled graphics processing stacked die chiplets 304 and I/O interfaces (not shown) which also form part of the data fabric. In various embodiments, the interconnect 318 includes any computer communications medium suitable for communication among the devices shown in FIG. 3, such as a bus, data fabric, and the like. In some implementations, the interconnect 318 is connected to and/or in communication with other components, which are not shown in FIG. 3 for ease of description. For example, in some implementations, interconnect 318 includes connections to one or more input/output (I/O) interfaces 206 such as shown and described with respect to FIG. 2.

As will be appreciated, the inter-chip data fabric 306 and/or the interconnects 318 often have such a high bandwidth that a single DMA engine is not capable of saturating available data fabric bandwidth. In various embodiments, and as described in more detail below, the system 300 utilizes the increased number of DMA engines 314 (e.g., one per chiplet 304 as illustrated in the embodiment of FIG. 3) to perform hardware-managed (i.e., mediated by device hardware without input by system software applications including, for example, one or both of an operating system or a hypervisor) splitting of transfer commands to multiple DMA engines 314 for processing of memory transfer commands via DMA. In this manner, the work specified by a transfer command is essentially split across multiple chiplets 304 and their respective DMA engines 314 such that total bandwidth usage goes up without each individual DMA engine 314 needing to get bigger or have more capabilities to increase overall DMA throughput and data fabric bandwidth usage.

During operation, in response to notifications (e.g., doorbell rings), the DMA engine 314 reads and executes the DMA transfer commands (with its associated parameters) from the DMA buffers 316 to execute data transfer operations and packet transfers. In various embodiments, the operation parameters (e.g., DMA command parameters) are usually the base address, the stride, the element size and the number of elements to communicate, for both the sender and the receiver sides. In particular, the DMA engines 314 are configured such that multiple DMA engines 314 across multiple dies (e.g., MCMs 302) or chiplets 304 read that same location containing the packet with DMA transfer parameters. Subsequently, as described in more detail below, the DMA engines 314 synchronize and coordinate with each other via hardware mechanisms to cooperatively work on the DMA transfer. In various embodiments, the DMA engines 314 conduct hardware-managed splitting of a command transfer such that a singular DMA engine only performs part of the DMA transfer. For example, splitting of the DMA transfer between two DMA engines 314 has the potential to double bandwidth usage or DMA transfer throughput per unit time, as each individual DMA engine is performing half the transfer at the same time as the other DMA engine.

Figure 4:
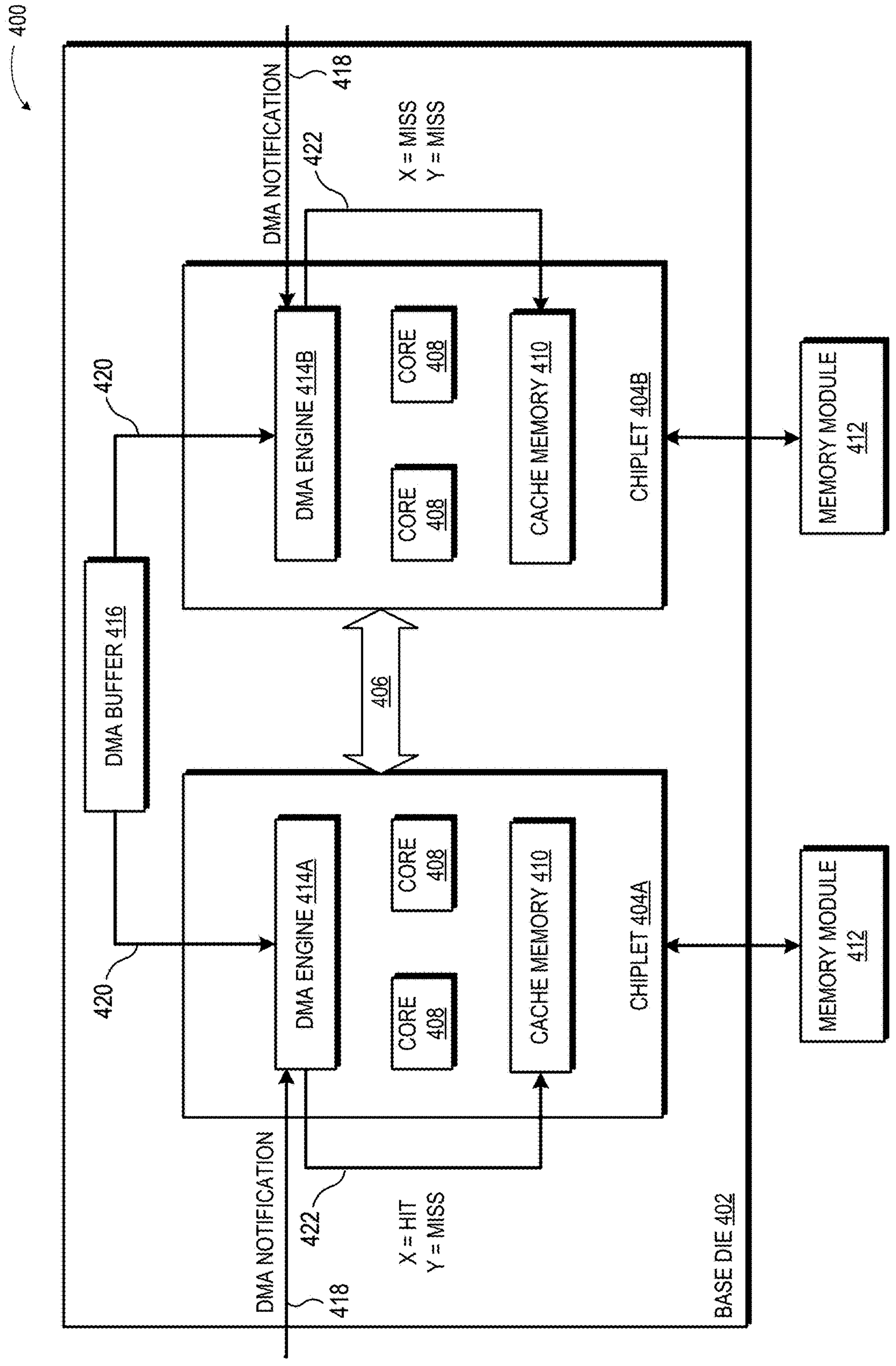
FIG. 4 is a block diagram illustrating an example of a system implementing hardware-managed splitting of transfer commands based on cache status in accordance with some embodiments.

Referring now to FIG. 4, illustrated is a block diagram illustrating an example of a system implementing hardware-managed splitting of transfer commands based on cache status in accordance with some embodiments. Device 400, or portions thereof, is implementable using some or all of semiconductor die 202 (as shown and described with respect to FIG. 2) and/or device 100 (as shown and described with respect to FIGS. 1 and 2). In various embodiments, the device 400 includes a base die 402 employing processing stacked die chiplets in accordance with some embodiments. The base die 402 is formed as a single semiconductor chip package including N=2 number of communicably coupled graphics processing stacked die chiplets 404. As shown, the processor base die 402 includes a first graphics processing stacked die chiplet 404A and a second graphics processing stacked die chiplet 404B.

In various embodiments, the base die 402 includes an inter-chip data fabric 406 that operates as a high-bandwidth die-to-die interconnect between chiplets (e.g., between the first graphics processing stacked die chiplet 404A and the second graphics processing stacked die chiplet 404B). In some embodiments, the base die 402 includes one or more processor cores 408 (e.g., CPUs and/or GPUs, or processor core dies) formed over each of the chiplets 404A-404B. Additionally, in various embodiments, each of the chiplets 404A-404B includes one or more levels of cache memory 410 and one or more memory PHYs (not shown) for communicating with external system memory modules 412, such as dynamic random access memory (DRAM) modules. When considered as a whole, the main memory (e.g., memory modules 412) communicably coupled to the multiple chiplets (e.g., chiplets 404A and 404B) and their local caches form the shared memory for the device 400. As will be appreciated, each chiplet 404 only has a direct physical connection to a portion of the whole shared memory system.

In various embodiments, the base die 402 includes two or more DMA engines 414 (e.g., a first DMA engine 414A and a second DMA engine 414B) positioned on top of the base die 402. In various embodiments, the DMA engines 414 coordinate DMA transfers of data between devices and memory (or between different locations in memory) within system 400. The DMA engines 414 coordinate, in various embodiments, moving of data between the multiple devices/accelerators while computation(s) are performed on other data at, for example, the processor cores 408. In various embodiments, the one or more DMA engines 414 are, in some embodiments, part of a DMA controller (not shown) but the terms DMA engine and DMA controller are used interchangeably herein. The DMA engines 414, in response to commands, operate to transfer data into and out of, for example, the one or more memory modules 412 without involvement of the processor cores 408. Similarly, the DMA engines 414, in some embodiments, perform intra-chip data transfers.

It should be recognized that although the graphics processing stacked die chiplets 304 are described below in the particular context of GPU terminology for ease of illustration and description, in various embodiments, the architecture described is applicable to any of a variety of types of parallel processors (such as previously described more broadly with reference to FIGS. 2 and 3) without departing from the scope of this disclosure. Further, although the DMA engines 414 are illustrated as sitting on top of each individual compute chiplet in FIG. 4, those skilled in the art will recognize that the hardware-managed splitting of transfer commands may be performed by DMA engines at various system locations without departing from the scope of this disclosure. For example, in some embodiments, the DMA engines sit on top of the base die (such as described with respect to FIG. 5). Similarly, although the systems and devices are described here in the context of chiplet-based systems, those skilled in the art will recognize that the hardware-managed splitting of transfer commands is not limited to that particular architecture and may be performed in any system configuration including multiple DMA engines, including monolithic dies.

In some embodiments, demand for DMA is handled by placing DMA commands (also interchangeably referred to as packets) generated by one or more of the processors 408 in memory mapped IO (MMIO) locations such as at DMA buffer 416 (also interchangeably referred to as DMA queues for holding DMA transfer commands). In various embodiments, the DMA buffer 416 is a hardware structure into which read or write instructions are transferred such that the DMA engines 414 can read DMA commands out of (e.g., rather than needing to go to DRAM memory). To perform data transfer operations, in various embodiments, the DMA engines 414 receive instructions (e.g., DMA transfer commands/data transfer requests) generated by the processors 408 by accessing a sequence of commands in the DMA buffer 416. The DMA engines 414 then retrieve the DMA commands (also known as descriptors) from the DMA buffer 416 for processing. In some embodiments, the DMA commands specify, for example, a start address for direct virtual memory access (DVMA) and I/O bus accesses, and a transfer length up to a given maximum.

Although the DMA buffer 416 is illustrated in FIG. 4 as being implemented at the base die 402 for ease of illustration, those skilled in the art will recognize that the DMA buffer 416 is implementable at various components of the systems and devices described herein without departing from the scope of this disclosure. For example, in some embodiments, the DMA buffer 416 is configured in main memory such as at memory modules 412. That location of the command queue in memory is where DMA engines 414 go to read transfer commands. In various embodiments, the DMA buffer 416 is further configured as one or more ring buffers (e.g., addressed by modulo-addressing).

As illustrated in FIG. 4, the DMA engines 414A and 414B receive a DMA notification 418 indicating that one or more DMA workloads or DMA jobs have been formed and filled in memory (such as the DMA buffer 416 or at a system memory module 412). In various embodiments, such as previously described, the DMA notification 418 includes a doorbell ring or other notifier that indicates DMA descriptors have been prepared in memory. In response to receiving the DMA notification 418, the DMA engines 414A and 414B each independently fetch a DMA job description 420 from the DMA buffer 416. In some embodiments, the communication path for the DMA engines 414 to retrieve DMA transfer commands includes a PCIE interface (e.g., I/O interfaces 106 such as previously discussed with respect to FIG. 1) as a path for processor to chiplet 404 connection. In other embodiments, the communication path for the DMA engines 414 to retrieve DMA transfer commands includes an internal data fabric (e.g., interconnect 318 such as previously discussed with respect to FIG. 3) as a path for on-die processor to DMA engine 414 connection.

In addition to independently fetching the same DMA job description from the same location (i.e., DMA buffer 416), each of the DMA engines 414A and 414B also independently determine a portion of data transfer requested by the DMA transfer command to perform. In one embodiment, DMA engines 414A and 414B each issue speculative DMA transfers by broadcasting a cache probe request 422 (e.g., a read and/or a write probe) to the cache memory 410 and main memory (e.g., memory module 412) of their respective chiplets 404. In response to the cache probe requests, the cache memory 410 and main memory of each chiplet 404 will return one or more return responses to the requesting DMA engine. For example, for a DMA read probe, the cache memories 410 can return a cache hit or a cache miss to indicate whether the requested data is found within cache memory 410.

As illustrated in FIG. 4, the retrieved DMA job description 420 is a single transfer command to read data from physical addresses X and Y. To determine whether some of the data associated with addresses X and Y is currently residing in cache memory 410 (e.g., L3 or some last level cache) of the first graphics processing stacked die chiplet 404A, the DMA engine 414A broadcasts a cache probe request 422 to the cache memory 410 (including cache controllers [not shown]) before memory modules 412 and receives one or more return responses indicating a cache hit for address X and a cache miss for address Y. To determine whether some of the data associated with addresses X and Y is currently residing in cache memory 410 of the second graphics processing stacked die chiplet 404B, the DMA engine 414B similarly broadcasts the cache probe request 422 to the cache memory 410 and receives one or more return responses indicating a cache miss for address X and a cache miss for address Y.

In various embodiments, probes include messages passed from a coherency point (e.g., at the DMA engine 414) to one or more caches in the computer system to request a response indicating whether the caches have a copy of a block of data and, in some implementations, to indicate a cache state into which the cache should place the block of data. In some implementations, if a DMA engine 414 receives a memory request targeting its corresponding memory controller (e.g., a memory request for data stored at an address or a region of addresses in a memory controlled by the memory controller), the DMA engine 414 performs a lookup (e.g., a tag-based lookup) to its corresponding cache directory to determine whether the request targets a memory address or region cached in at least one cache line of any of the cache subsystems.

Additionally, a particular physical address will only exist at one location of the memory modules 412. For example, in chiplet-based systems, each die is assigned or otherwise physically connected to a memory channel having a particular range of addresses (or certain address patterns belong to local vs. remote dies). From virtual to physical address translations, each DMA engine 414 is aware of whether the addresses of a DMA transfer command is are within the range of memory that is connected to that physical die. If a DMA engine 414 decodes the DMA transfer command and determines that the data is not in local memory, the DMA engine 414 will skip those portions of the DMA job. Additionally, if all DMA engines 414 operate in this same manner, then the entire memory channel will be covered.

In the example embodiment of FIG. 4, data for physical address X and physical address Y are stored at the memory module 412 directly connected to the second graphics processing stacked die chiplet 404B. However, as the cache memory 410 of the first graphics processing stacked die chiplet 404A already contains the requested data for physical address X, the DMA engine 414A performs the portion of data transfer associated with address X (as opposed to retrieving the data from the cache of a different chiplet). Accordingly, having the DMA engine 414A perform the DMA transfer of data associated with address X is more energy optimal and lower latency than crossing over the inter-chip data fabric 406 to access the data-owning memory module 412 (or cache) of a different chiplet.

Similarly, due to the cache probe request 422 resulting in a cache miss at both cache memories 410 of the first and second chiplets 404, the DMA engine 414B of the data-owning cache memory 410 performs DMA transfer of data associated with physical address Y. In other words, the DMA engine 414 that is closer to the data is the engine that performs the DMA transfer. Subsequently, the DMA engines 414 signal that the DMA transfer is completed, such as by sending an interrupt signal to the processor cores 408. In this manner, the hardware-managed coordination of splitting a whole DMA transfer packet and performance of the DMA transfer (each DMA engine performing its transfer in parallel with other DMA engines) by the closer DMA engine 414 prevents the DMA transfer operation from needing to read the data from memory across all different channels (e.g., reading data from the cache memory or DRAM associated with a different chiplet requires traffic crossing the interconnect and taking an energy performance hit).

Once all DMA engines 414 have completed their portion of the DMA job, a signal is returned to the requesting processor to indicate that the DMA job is complete. For example, in some embodiments, this is accomplished by writing a value indicating completion to the DMA buffer, writing a value to some other location in memory, through an interrupt to the requesting processor, and the like. Because the requesting processor is only notified when the entire DMA job has completed, the DMA engines 414 synchronize in some fashion such that the DMA job completion is only indicated when all DMA engines 414 are done with their portion of the DMA job. In some embodiments, this is accomplished through a variety of techniques, such as atomically incrementing a counter in the DMA buffer to indicate how many DMA engines have completed their portion, through a synchronization structure in memory, or through direct messaging between the DMA engines over the fabric 406.

In other embodiments, such as described in more detail below, the DMA engines determine the splitting of packets of transfer commands based on an amount of data transfer and interleaving the workload amongst multiple DMA engines (instead of looking at the physical addresses to be accessed such as described in FIG. 4).

Figure 5:
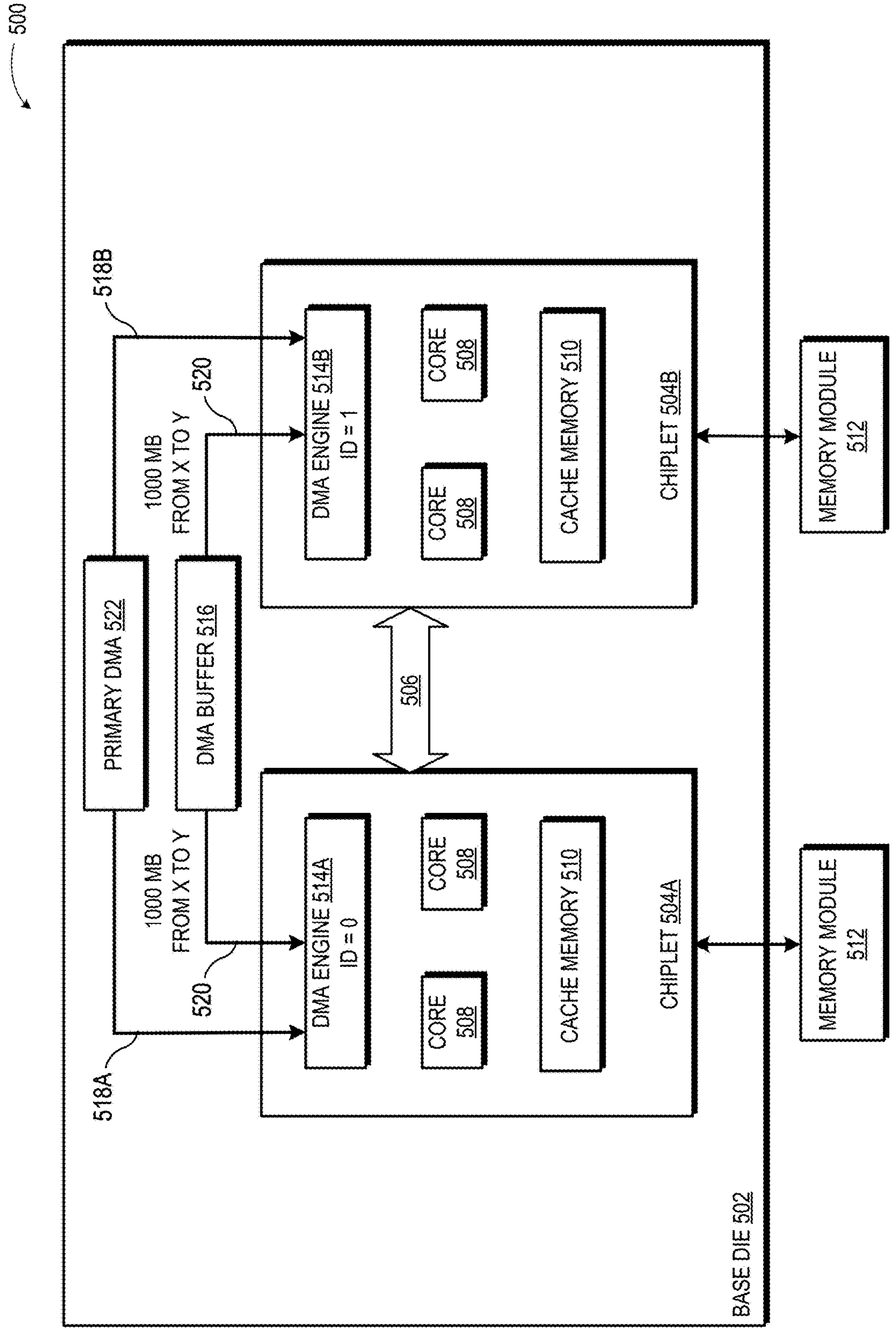
FIG. 5 is a block diagram illustrating another example of a system implementing hardware-managed splitting of transfer commands in accordance with some embodiments.

Referring now to FIG. 5, illustrated is a block diagram illustrating another example of a system implementing hardware-managed splitting of transfer commands in accordance with some embodiments. Device 500, or portions thereof, is implementable using some or all of semiconductor die 202 (as shown and described with respect to FIG. 2) and/or device 100 (as shown and described with respect to FIGS. 1 and 2). In various embodiments, the device 500 includes a base die 502 employing processing stacked die chiplets in accordance with some embodiments. The base die 502 is formed as a single semiconductor chip package including N=2 number of communicably coupled graphics processing stacked die chiplets 504. As shown, the processor base die 502 includes a first graphics processing stacked die chiplet 504A and a second graphics processing stacked die chiplet 504B.

In various embodiments, the base die 502 includes an inter-chip data fabric 506 that operates as a high-bandwidth die-to-die interconnect between chiplets (e.g., between the first graphics processing stacked die chiplet 504A and the second graphics processing stacked die chiplet 504B). In some embodiments, the base die 502 include one or more processor cores 508 (e.g., CPUs and/or GPUs, or processor core dies) formed over each of the chiplets 504A-504B. Additionally, in various embodiments, each of the chiplets 504A-504B includes one or more levels of cache memory 510 and one or more memory PHYs (not shown) for communicating with external system memory modules 512, such as dynamic random access memory (DRAM) modules. When considered as a whole, the main memory (e.g., memory modules 512) communicably coupled to the multiple chiplets (e.g., chiplets 504A and 504B) and their local caches form the shared memory for the device 500. As will be appreciated, each chiplet 504 only has a direct physical connection to a portion of the whole shared memory system.

In various embodiments, the base die 502 includes two or more DMA engines 514 (e.g., a first DMA engine 514A and a second DMA engine 514B) positioned on top of the base die 502. In various embodiments, the DMA engines 514 coordinate DMA transfers of data between devices and memory (or between different locations in memory) within system 500. The DMA engines 514 coordinate, in various embodiments, moving of data between the multiple devices/accelerators while computation(s) are performed on other data at, for example, the processor cores 508.

In various embodiments, the one or more DMA engines 514 are, in some embodiments, part of a DMA controller (not shown) but the terms DMA engine and DMA controller are used interchangeably herein. The DMA engines 514, in response to commands, operate to transfer data into and out of, for example, the one or more memory modules 512 without involvement of the processor cores 508. Similarly, the DMA engines 514, in some embodiments, perform intra-chip data transfers. In some embodiments, the DMA engines 514 include a front-end packet processor (not shown) and a back-end command engine and transfer engine (not shown). The transfer engine is the portion of the DMA engine 514 that performs the actual DMA transfer/data movement and the command engine drives the transfer engine to tell it what actions to perform. In various embodiments, a packet processor includes one or more processing engines, such as advanced RISC machine (ARM), Microprocessor without Interlocked Pipeline Stages (MIPS), serial data processor (SDP), and/or other RISC cores enabled to execute buffer management, table lookup, queue management, fabric processing, and host processing functions known to the art. The packet processor, in various embodiments, is a microcontroller that waits on DMA packets to arrive. After receiving and reading DMA packets, the packet processor turns on the back end of the DMA controller to perform data transfer.

In various embodiments, the back-end command engine is a microcontroller (or other firmware, state machine, and the like) that other system components communicate with to initiate DMA transfers. In some embodiments, the command engine includes a single command engine that drives multiple transfer engines. In other embodiments, the command engine includes a single command engine per transfer engine. Additionally, the DMA engine 514 includes some distributed algorithm that allows the command engines to agree on what actions to perform. For example, if a single DMA engine 514 includes two command engines, then each command engine could be instructed by hardware that there is a packet waiting in memory. After reading the packet, the command engines synchronize with each other through a sync mechanism, such as by a command engine bus or a special location in memory that both command engines know about to perform a software synchronization such as a barrier or a lock. In various embodiments, both command engines would read the packet. Subsequently, both command engines would read the command and communicate with each other to split the data transfer. As will be appreciated, the command engines synchronize with each other at various instances, such as to tell the requesting processor (e.g., CPU or processor cores 508) that the DMA transfer is complete (after both command engines are done performing their respective portions of the DMA transfer).

It should be recognized that although the graphics processing stacked die chiplets 504 are described below in the particular context of GPU terminology for ease of illustration and description, in various embodiments, the architecture described is applicable to any of a variety of types of parallel processors (such as previously described more broadly with reference to FIGS. 2 and 3) without departing from the scope of this disclosure. Further, although the DMA engines 514 are illustrated as sitting on top of the base die 502 in FIG. 5, those skilled in the art will recognize that the hardware-managed splitting of transfer commands may be performed by DMA engines at various system locations without departing from the scope of this disclosure. For example, in some embodiments, the DMA engines sit on top of each individual compute chiplet (such as previously described in more detail with respect to FIG. 4). Similarly, although the systems and devices are described here in the context of chiplet-based systems, those skilled in the art will recognize that the hardware-managed splitting of transfer commands is not limited to that particular architecture and may be performed in any system configuration including multiple DMA engines, including monolithic dies.

In some embodiments, demand for DMA is handled by placing DMA commands (also interchangeably referred to as packets) generated by one or more of the processors 508 in memory mapped IO (MMIO) locations such as at DMA buffer 516 (also interchangeably referred to as DMA queues for holding DMA transfer commands). In various embodiments, the DMA buffer is a hardware structure into which read or write instructions are transferred such that the DMA engines 514 can read DMA commands out of (e.g., rather than needing to go to DRAM memory). To perform data transfer operations, in various embodiments, the DMA engines 514 receive instructions (e.g., DMA transfer commands/data transfer requests generated by the processors 508). For example, in some embodiments, the DMA engines 514 retrieve DMA commands (also known as descriptors) from the DMA buffer 516 for processing.

Although the DMA buffer 516 is illustrated in FIG. 5 as being implemented at the base die 502 for ease of illustration, those skilled in the art will recognize that the DMA buffer 516 is implementable at various components of the systems and devices described herein without departing from the scope of this disclosure. For example, in some embodiments, the DMA buffer 516 is configured in main memory such as at memory modules 512. That location of the command queue in memory is where DMA engines 514 go to read transfer commands.

As illustrated in FIG. 5, in some embodiments, the DMA engines 514A and 514B receive a DMA job notification 518 (a first DMA job notification 518A to the DMA engine 514A and a second DMA job notification 518B to the DMA engine 514B) from a primary DMA engine 522. The primary DMA engine 522 that operates as a central agent that intermediates between submitters of DMA jobs (e.g., a server, CPUs, and the like) and secondary/remote DMA engines that perform the actual data transfers (e.g., first DMA engine 514A and second DMA engine 514B).

In some embodiments, such as previously described with respect to FIG. 4, the primary DMA engine 522 submits the first DMA job notification 518A and the second DMA job notification 518B, which are the same signals, indicating that one or more DMA workloads or DMA jobs have been formed and filled in memory (such as the DMA buffer 516 or at a system memory module 512). In response to receiving the DMA notification 518, the DMA engines 514A and 514B each independently fetch a DMA job description 520 from the DMA buffer 516 and split the DMA job workload in a distributed decision manner in which two or more separate entities (e.g., the two DMA engines 514A and 514B) each read the same packet and independently determine how to perform the DMA transfer. Alternatively, in other embodiments, the primary DMA engine 522 submits DMA job descriptors directly to the DMA engines 514A and 514B and skips the step of instructing retrieval of DMA job descriptions from buffer 516.

In addition to independently fetching the same DMA job description from the same location (i.e., DMA buffer 516), each of the DMA engines 514A and 514B also independently determine a portion of data transfer requested by the DMA transfer command to perform. For example, such as described in more detail with respect to FIG. 4, the DMA engines 514 perform hardware-managed coordination based on splitting a whole DMA transfer packet and performance of the DMA transfer (each DMA engine performing its transfer in parallel with other DMA engines) by the closer DMA engine 514 (such as closer via same-die cache or a local DRAM without traversing an inter-chiplet interconnect).

In some embodiments, the DMA engines 514 perform hardware-managed coordination via a determination of splitting packets of transfer commands based on an amount of data transfer and interleaving the workload amongst multiple DMA engines. For example, as illustrated in FIG. 5, the DMA job description 520 is a single transfer command instructing the transfer of 1000 megabytes of data from physical address X to physical address Y. In one embodiment, the DMA engines 514 equally split the total DMA transfer size amongst themselves. For example, the device 500 includes two DMA engines with the first DMA engine 514A having a global ID=0 and the second DMA engine 514B having a global ID=1. Accordingly, the device 500 hardware includes information identifying a total number and a relative ordering of DMA engines within the hardware configuration. In this example, after reading the same DMA job description 520, the first DMA engine 514A (e.g., global ID=0) performs a first half of the DMA transfer by transferring the first 500 megabytes of data. Similarly, the second DMA engine 514B (e.g., global ID=1) performs a second half of the DMA transfer in parallel by transferring the second 500 megabytes of data.

Those skilled in the art will recognize that this splitting of transfer command workloads is not limited to the specific embodiments described herein, and that any hardware-managed coordination of DMA transfer and interleaving of DMA workloads amongst multiple DMA engines is implementable without departing from the scope of this disclosure. By way of non-limiting example, in some embodiments, implementations of hardware-managed DMA workload splitting include an odd/even byte number split (e.g., on a single byte basis), memory channel addressing, memory page sizes, memory page locations, alternating data block basis that is not completely interleaved, or any other type of interleaving. As will be appreciated the specific interleaving size, in various embodiments, is dependent upon the specific interconnect hardware, memory transfer sizes, and caches within the system. The optimization of interleaving type and which data split type is variable dependent upon the type of system microarchitecture for specific implementations. For example, in one embodiment, the interleaving split size is based on page translation size such that transfer size matches page translation size for reducing an amount of page translations that would need to be performed. In another embodiment, each DMA engine 514 is assigned a specific amount of data to be transferred (e.g., 1000 megabytes) instead of address range. For example, in such an embodiment, each DMA engine 514 transfers 1000 megabytes of data in parallel with other DMA engines such that the DMA job description 520 is a single transfer command instructing the transfer of 1000 megabytes of data from physical address X to physical address Y. In at least some embodiments, only the first DMA engine 514A is turned on while the second DMA engine 514B remains idle.

In another embodiment, the first DMA job notification 518A to the DMA engine 514A and the second DMA job notification 518B to the DMA engine 514B notifications are not indicators that the DMA engines should go fetch the DMA job description 520 from the DMA buffer 516. Rather, the primary DMA engine 522 breaks out a single DMA job (e.g., DMA job description 520 instructing the transfer of 1000 megabytes of data from physical address X to physical address Y) into multiple smaller jobs and submits different workloads to each separate DMA engine 514 individually. Each secondary/remote DMA engine thus sees a portion of the original DMA job description 520.

In this example, the primary DMA engine 522 splits the DMA job description 520 into two smaller workloads by submitting the first DMA job notification 518A instructing the first DMA engine 514A (as a secondary/remote DMA engine) to perform a first half of the DMA transfer by transferring the first 500 megabytes of data. Similarly, the primary DMA engine 522 submits the second DMA job notification 518B instructing the second DMA engine 514B (as a secondary/remote DMA engine) to perform a second half of the DMA transfer by transferring the second 500 megabytes of data. After each individual secondary/remote DMA engine finishes its respective portions of the DMA job, the secondary DMA engines 514 notify the primary DMA engine 522 of their work completion. Subsequently, the primary DMA engine 522 communicates that the overall entirety of the job has been completed.

In this example, each individual DMA engine 514 performs the entirety of the job that is submitted to it (e.g., the DMA engines 514 act as a pure dummy by performing workloads assigned to it without any discretion, in contrast to the previously described embodiment in which each DMA engine individually determines which portion of a workload is applicable to it locally). In various embodiments, the primary DMA engine 522 determines a number of DMA engines available for it to assign work to and/or available bandwidth or other processing resources available to each remote DMA engine.

Figure 6:
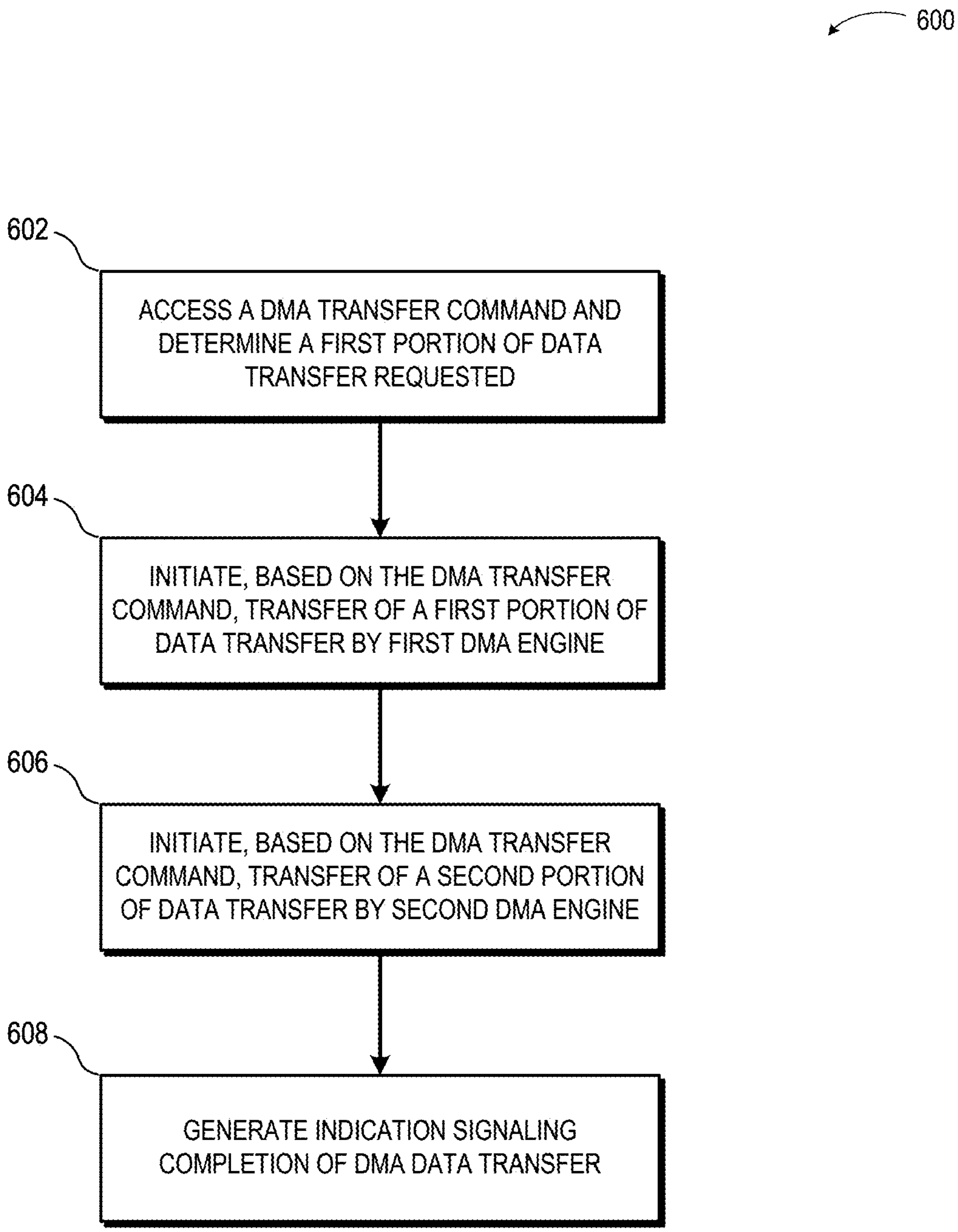
FIG. 6 is a flow diagram illustrating a method of performing hardware-managed splitting of DMA transfer commands in accordance with some embodiments.

FIG. 6 is a block diagram of a method 600 of performing hardware-managed splitting of DMA transfer commands in accordance with some embodiments. For ease of illustration and description, the method 600 is described below with reference to and in an example context of the systems and devices of FIGS. 1-5. However, the method 600 is not limited to these example contexts, but instead in different embodiments is employed for any of a variety of possible system configurations using the guidelines provided herein.

The method 600 begins at block 602 with the accessing, by a first DMA engine, of a DMA transfer command and determining a first portion of a data transfer requested by the DMA transfer command. For example, such as illustrated in FIG. 4 with respect to DMA engines 414, the DMA engines 414A and 414B receive a DMA notification 418 indicating that one or more DMA workloads or DMA jobs have been formed and filled in memory (such as the DMA buffer 416 or at a system memory module 412). In various embodiments, such as previously described, the DMA notification 418 includes a doorbell ring or other notifier that indicates DMA descriptors have been prepared in memory. In response to receiving the DMA notification 418, the DMA engines 414A and 414B each independently fetch a DMA job description 420 from the DMA buffer 416.

In some embodiments, each of the DMA engines 414A and 414B also independently determine a portion of data transfer requested by the DMA transfer command to perform. In one embodiment, DMA engines 414A and 414B each issue speculative DMA transfers by broadcasting a cache probe request 422 (e.g., a read and/or a write probe) to the cache memory 410 and main memory (e.g., memory module 412) of their respective chiplets 404. In response to the cache probe requests, the cache memory 410 and main memory of each chiplet 404 will return one or more return responses to the requesting DMA engine. For example, for a DMA read probe, the cache memories 410 can return a cache hit or a cache miss to indicate whether the requested data is found within cache memory 410.

In other embodiments, such as illustrated in FIG. 5 with respect to DMA engines 514, DMA engines 514A and 514B receive a DMA job notification 518 (a first DMA job notification 518A to the DMA engine 514A and a second DMA job notification 518B to the DMA engine 514B) from a primary DMA engine 522. The primary DMA engine 522 breaks out a single DMA job (e.g., DMA job description 520 instructing the transfer of 1000 megabytes of data from physical address X to physical address Y) into multiple smaller jobs and submits different workloads to each separate DMA engine 514 individually. Each secondary/remote DMA engine thus sees a portion of the original DMA job description 520.

The method 600 continues at block 604 with initiating, based at least in part on the DMA transfer command, transfer of the first portion of the data transfer by the first DMA engine. For example, such as illustrated in FIG. 4 with respect to the first DMA engine 414A, to determine whether some of the data associated with addresses X and Y is currently residing in cache memory 410 (e.g., L3 or some last level cache) of the first graphics processing stacked die chiplet 404A, the DMA engine 414A broadcasts a cache probe request 422 to the cache memory 410 (including cache controllers [not shown]) before memory modules 412 and receives one or more return responses indicating a cache hit for address X and a cache miss for address Y. In the example embodiment of FIG. 4, data for physical address X and physical address Y are stored at the memory module 412 directly connected to the second graphics processing stacked die chiplet 404B. Because the cache memory 410 of the first graphics processing stacked die chiplet 404A already contains the requested data for physical address X, the DMA engine 414A performs the portion of data transfer associated with address X (as opposed to retrieving the data from the cache of a different chiplet).

In some embodiments, such as illustrated in FIG. 5 with respect to the DMA engines 514, the DMA engines 514 perform hardware-managed coordination via a determination of splitting packets of transfer commands based on an amount of data transfer and interleaving the workload amongst multiple DMA engines. For example, as illustrated in FIG. 5, the DMA job description 520 is a single transfer command instructing the transfer of 1000 megabytes of data from physical address X to physical address Y. In one embodiment, the DMA engines 514 equally split the total DMA transfer size amongst themselves. For example, the device 500 includes two DMA engines with the first DMA engine 514A having a global ID=0 and the second DMA engine 514B having a global ID=1. Accordingly, the device 500 hardware includes information identifying a total number and a relative ordering of DMA engines within the hardware configuration. In this example, after reading the same DMA job description 520, the first DMA engine 514A (e.g., global ID=0) performs a first half of the DMA transfer by transferring the first 500 megabytes of data. Similarly, the second DMA engine-415B 514B (e.g., global ID=1) performs a second half of the DMA transfer in parallel by transferring the second 500 megabytes of data.

The method 600 continues at block 606 with initiating, based at least in part on the DMA transfer command, transfer of a second portion of the data transfer by a second DMA engine. For example, such as illustrated in FIG. 4 with respect to the first DMA engine 414A, to determine whether some of the data associated with addresses X and Y is currently residing in cache memory 410 of the second graphics processing stacked die chiplet 404B, the DMA engine 414B similarly broadcasts the cache probe request 422 to the cache memory 410 and receives one or more return responses indicating a cache miss for address X and a cache miss for address Y. Due to the cache probe request 422 resulting in a cache miss at both cache memories 410 of the first and second chiplets 404, the DMA engine 414B of the data-owning cache memory 410 performs DMA transfer of data associated with physical address Y. In other words, the DMA engine 414 that is closer to the data is the engine that performs the DMA transfer.

At block 608, after transferring the first portion and the second portion of the data transfer, an indication is generated that signals completion of the data transfer requested by the DMA transfer command. For example, such as illustrated in FIG. 4, the DMA engines 414 signal that the DMA transfer is completed, such as by sending an interrupt signal to the processor cores 408 after some form of synchronization between the DMA engines 414. Similarly, with respect to FIG. 5, the secondary DMA engines 514 notify the primary DMA engine 522 of their work completion after each individual secondary/remote DMA engine finishes their respective portions of the DMA job. Subsequently, the primary DMA engine 522 communicates that the overall entirety of the job has been completed.

Accordingly, as discussed herein, the hardware-managed coordination of splitting a whole DMA transfer packet and performance of the DMA transfer (each DMA engine performing its transfer in parallel with other DMA engines) by the closer DMA engine prevents the DMA transfer operation from needing to read the data from memory across all different channels (e.g., reading data from the cache memory or DRAM associated with a different chiplet requires traffic crossing the interconnect and taking an energy performance hit). For example, those skilled in the art will recognize that back-and-forth DMA traffic contends with other traffic and consumes power. Thus, hardware-managed splitting of DMA commands results in reduced power and increased bandwidth for other traffic usages.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A processor, comprising:

a first direct memory access (DMA) engine configured to initiate, based at least in part on a DMA transfer command, transfer of a first portion of a data transfer; and a second DMA engine configured to initiate, independent of the first DMA engine and based at least in part on the DMA transfer command, transfer of a second portion of the data transfer.

2. The processor of claim 1, wherein:

the first DMA engine is configured to receive a DMA notification indicating that the DMA transfer command is stored at a DMA buffer in system memory; and the first DMA engine is configured to fetch the DMA transfer command from the DMA buffer.

3. The processor of claim 2, wherein the first DMA engine is configured to initiate transfer of the first portion of the data transfer by:

transmitting a cache probe request to a cache memory; and transferring the first portion of the data transfer based on receiving a return response indicting a cache hit in the cache memory.

4. The processor of claim 2, wherein the second DMA engine is configured to initiate transfer of the second portion of the data transfer by:

transmitting a cache probe request to a cache memory; and transferring the second portion of the data transfer from an owner main memory based on receiving a return response indicting a cache miss in the cache memory.

5. The processor of claim 4, wherein the first DMA engine is configured to transfer the first portion of the data transfer further by interleaving a total DMA transfer size between the first DMA engine and the second DMA engine.

6. The processor of claim 1, further comprising:

a primary DMA engine configured to receive the DMA transfer command and split the DMA transfer command into a plurality of smaller workloads for independent initiation by respective DMA engines.

7. The processor of claim 6, wherein the first DMA engine is configured to:

receive, from the primary DMA engine, one of the plurality of smaller workloads.

8. The processor of claim 1, wherein the processor comprises:

a base integrated circuit (IC) die including a plurality of processing stacked die chiplets 3D stacked on top of the base IC die, wherein the base IC die includes an inter-chip data fabric communicably coupling each of the plurality of processing stacked die chiplets together.

9. The processor of claim 8 wherein:

the first DMA engine and the second DMA engine are stacked on top of the base IC die.

10. The processor of claim 1, wherein the first DMA engine includes a single command engine that drives multiple transfer engines.

11. A system, comprising:

a host processor communicably coupled to a parallel processor multi-chip module, wherein the parallel processor multi-chip module includes:

a first direct memory access (DMA) engine configured to initiate, based at least in part on a DMA transfer command, independent of the first DMA engine and transfer of a first portion of a data transfer; and a second DMA engine configured to initiate, based at least in part on the DMA transfer command, transfer of a second portion of the data transfer.

12. The system of claim 11, wherein:

the first DMA engine is configured to receive a DMA notification indicating that the DMA transfer command is stored at a DMA buffer in system memory; and the first DMA engine is configured to fetch the DMA transfer command from the DMA buffer.

13. The system of claim 12, wherein the first DMA engine is configured to initiate transfer of the first portion of the data transfer by:

transmitting a cache probe request to a cache memory; and transferring the first portion of the data transfer based on receiving a return response indicting a cache hit in the cache memory.

14. The system of claim 12, wherein the second DMA engine is configured to initiate transfer of the second portion of the data transfer by:

transmitting a cache probe request to a cache memory; and transferring the second portion of the data transfer from an owner main memory based on receiving a return response indicting a cache miss in the cache memory.

15. The system of claim 14, wherein the first DMA engine is configured to transfer the first portion of the data transfer further by interleaving a total DMA transfer size between the first DMA engine and the second DMA engine.

16. The system of claim 11, further comprising:

a primary DMA engine configured to receive the DMA transfer command and split the DMA transfer command into a plurality of smaller workloads.

17. The system of claim 16, wherein the first DMA engine is configured to:

receive, from the primary DMA engine, one of the plurality of smaller workloads.

18. The system of claim 11, wherein the host processor comprises:

a base integrated circuit (IC) die including a plurality of processing stacked die chiplets 3D stacked on top of the base IC die, wherein the base IC die includes an inter-chip data fabric communicably coupling each of the plurality of processing stacked die chiplets together.

19. A method, comprising:

splitting, at a primary direct memory access (DMA) engine, a DMA transfer command into a plurality of smaller workloads; and submitting a different workload of the plurality of smaller workloads to each of a plurality of DMA engines.

20. The method of claim 19, wherein each of the plurality of DMA engines is configured to independently determine a portion of a data transfer by interleaving a total DMA transfer size amongst the plurality of DMA engines.

* * * * *